(12) United States Patent
Cortina et al.

(10) Patent No.: US 7,874,574 B2
(45) Date of Patent: Jan. 25, 2011

(54) ARRANGEMENT FOR RETAINING AN AIRBAG HOUSING AND COVER

(75) Inventors: Roger Cortina, Amherstburg (CA); Georgina Leary, Macomb, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 420 days.

(21) Appl. No.: 11/264,498

(22) Filed: Nov. 1, 2005

(65) Prior Publication Data
US 2007/0096441 A1    May 3, 2007

(51) Int. Cl.
*B60R 21/215* (2006.01)
*B60R 21/217* (2006.01)
(52) U.S. Cl. .................... 280/728.2; 280/728.3
(58) Field of Classification Search ............ 280/728.2, 280/728.3; *B60R 21/203, 21/215*
See application file for complete search history.

(56) References Cited

U.S. PATENT DOCUMENTS

| | | | | |
|---|---|---|---|---|
| 5,060,972 A | * | 10/1991 | Satoh et al. ............... | 280/732 |
| 5,312,129 A | * | 5/1994 | Ogawa ..................... | 280/728.2 |
| 5,503,425 A | * | 4/1996 | Emambakhsh et al. ... | 280/728.2 |
| 5,735,542 A | * | 4/1998 | Bohn ........................ | 280/728.2 |
| 5,887,891 A | * | 3/1999 | Taquchi et al. ........... | 280/728.2 |
| 6,010,146 A | * | 1/2000 | Otsuka et al. ............ | 280/728.2 |
| 6,502,851 B2 | * | 1/2003 | Kitagawa ................. | 280/728.2 |
| 6,543,802 B1 | * | 4/2003 | Uchiyama et al. ........ | 280/728.2 |
| 6,601,870 B2 | * | 8/2003 | Suzuki et al. ............. | 280/728.3 |
| 6,929,280 B2 | * | 8/2005 | Yasuda et al. ............ | 280/728.2 |

* cited by examiner

*Primary Examiner*—Paul N Dickson
*Assistant Examiner*—Laura Freedman
(74) *Attorney, Agent, or Firm*—Ralph E. Smith

(57) ABSTRACT

An arrangement for retaining a cover to an airbag housing, including a reaction housing. The retaining arrangement includes a removable retainer ring, a plurality of cover tabs extending outwardly from a surface of the cover, and a plurality of housing tabs extending outwardly from a surface of the reaction housing. The plurality of cover tabs and housing tabs are positioned such that each cover tab will align with and abut a corresponding housing tab when the cover is engaged with the air bag housing. The retainer ring includes openings positioned to receive the plurality of cover tabs and housing tabs. The plurality of cover tabs and housing tabs are biased into the openings in the retainer ring to removably secure the reaction housing to the cover.

11 Claims, 5 Drawing Sheets

ARRANGEMENT FOR RETAINING AN AIRBAG HOUSING AND COVER

FIELD OF THE INVENTION

The present invention relates to an airbag module assembly for a motor vehicle and more particularly to an arrangement which prevents an airbag module cover from separating from the airbag housing during airbag deployment.

BACKGROUND OF THE INVENTION

Conventional automotive restraint systems, including airbag module assemblies, are installed to protect the vehicle occupants in the event of a collision. Airbag module assemblies are installed by automobile manufacturers in multiple locations throughout the cabin of the vehicle, including the steering wheel (known as a driver's airbag or "DAB"), the passenger side dashboard (a passenger airbag or "PAB"), and the side doors. Many airbag modules implement similar components, such as airbags, inflators, ignitors, covers and reaction housings. Typically, these components are assembled within the reaction housing which in turn mates or interlocks with the cover to form an airbag storage volume.

The prior art has resorted to a number of approaches for attaching the cover to the reaction housing, including anchoring the sidewalls of the cover to the reaction housing through the use of rivets, bolts, or brackets. Referring to FIG. 1, an airbag module assembly, referred to generally with the reference numeral 1, utilizing one such conventional cover attachment method, also referred to as the snap-and-hook method, is shown. The airbag module assembly 1 includes a module cover 100 having an upper, typically decorative surface with downwardly extending sidewalls 200. Openings 10a, 10b, 10c, 10d, 10e, 10f and 10g provided in the sidewalls 200 are spaced and aligned from the lower distal ends of the sidewalls 200. As is known in the art, the module cover 100 is typically provided with one or more tear seams (not shown) for providing opening of the module cover 100 upon deployment of an airbag 60.

The airbag module assembly 1 further includes a reaction housing 300 having a base with a central opening through which an upper portion of an inflator 350 projects. The inflator 350 is attached to the reaction housing 300 by fasteners 352, 354, 356 and 358. A folded airbag cushion 60 is then retained on the base of the reaction housing 300 surrounding the inflator 350 by an airbag mounting member (not shown) or retainer ring (not shown) attached to the base as is well known in the art. An electrical connector 90a, 90b is provided for coupling to an inflator 350 which serves to inflate and deploy the airbag cushion 60. The reaction housing 300 includes two brackets 80a, 80b provided for attaching the airbag module assembly 1 to the steering wheel (not shown) of the vehicle.

As shown in FIG. 1, the base of the airbag housing 300 has a plurality of downwardly extending legs 70a, 70b, 70c, 70d, 70e, 70f and 70g each having a U-shaped groove forming a hook-like tabs for lockingly attaching the reaction housing 300 to the sidewalls 200 of the airbag module cover 100. The airbag module cover 100 is attached to the reaction housing 300 by placing the cover over the housing, and inserting the openings 10a, 10b, 10c, 10d, 10e, 10f and 10g in the sidewalls 200 of the airbag module cover 100 into the corresponding legs 70a, 70b, 70c, 70d, 70e, 70f and 70g on the reaction housing 300. The tabs on the legs 70a, 70b, 70c, 70d, 70e, 70f and 70g are then deformed or biased inwardly into the openings 10a, 10b, 10c, 10d, 10e, 10f and 10g to lockingly attach the sidewalls 200 of the airbag module cover 100 to the reaction housing 300.

One drawback of conventional methods of airbag module cover attachment is that such methods typically require additional steps in the manufacturing process, resulting in production delays due to increased time needed to produce the airbag module assembly. In addition, service of airbag modules utilizing such attachment methods is time consuming and may result in damage to either the cover or the reaction housing during detachment and removal of the rivets, bolts, or snap hooks.

Therefore, there exists a need for an apparatus for attaching a cover to a reaction housing that reduces manufacturing time while remaining simple in design and easily accessible for future service.

SUMMARY OF THE INVENTION

Accordingly, one aspect of the present invention provides an arrangement for retaining a cover to an airbag housing, including a reaction housing, which reduces manufacturing time, is simple to design and easily accessible, wherein the retaining arrangement includes a removable retainer ring, a plurality of cover tabs extending outwardly from a surface of the cover, and a plurality of housing tabs extending outwardly from a surface of the reaction housing. The plurality of cover tabs and housing tabs are positioned such that each cover tab will align with and abut a corresponding housing tab when the cover is engaged with the air bag housing. The retainer ring includes openings positioned to receive the plurality of cover tabs and housing tabs. The plurality of cover tabs and housing tabs are biased into the openings in the retainer ring to removably secure the reaction housing to the cover.

A second aspect of the present invention provides an arrangement for retaining a cover to an airbag housing, including a reaction housing, wherein the retaining arrangement includes a removable retainer ring, a plurality of cover openings formed in a surface of the cover, and a plurality of housing tabs extending outwardly from a surface of the reaction housing. The plurality of cover openings and housing tabs are positioned such that each housing tab will align with and be inserted into a corresponding cover opening when the cover is engaged with the airbag housing. The retainer ring includes openings to receive the housing tabs and is positioned to enclose the cover. The plurality of housing tabs are biased into the openings in the retainer ring to removably secure the reaction housing to the cover.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
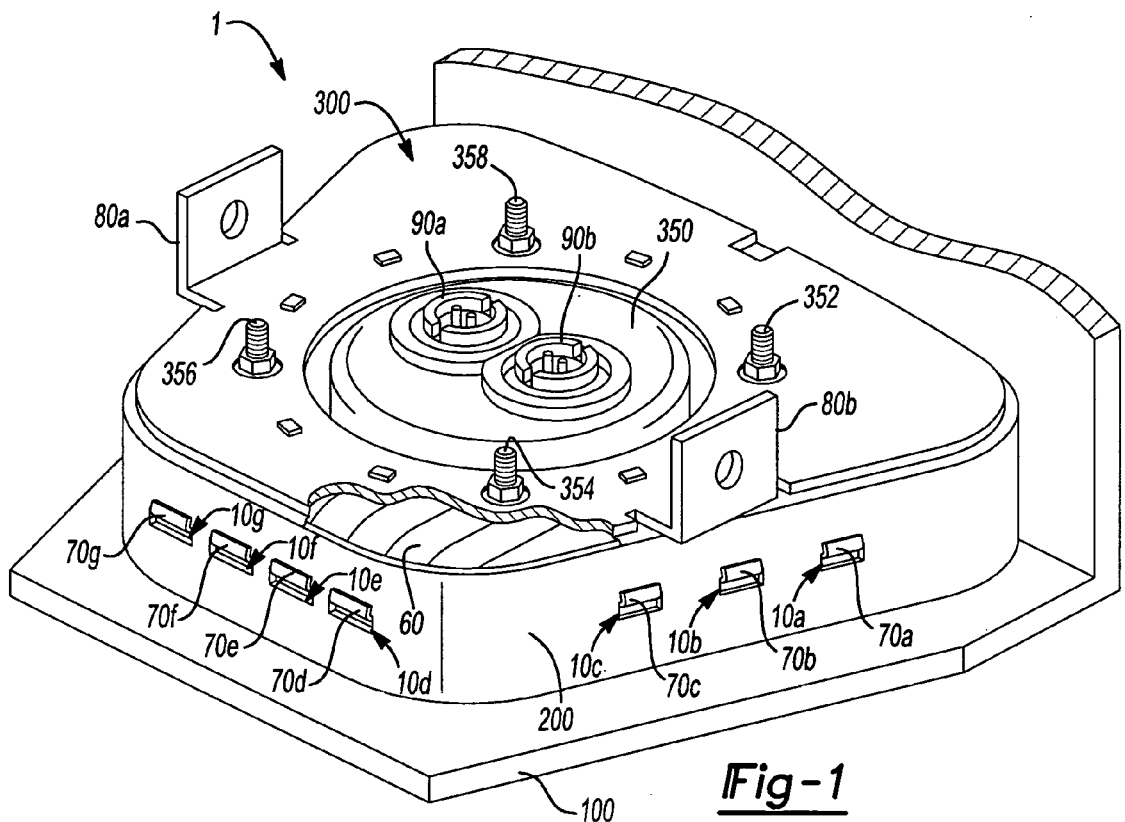
FIG. 1 is a perspective view of a snap and hook attachment arrangement for attaching a cover to an air bag housing.
Figure 2:
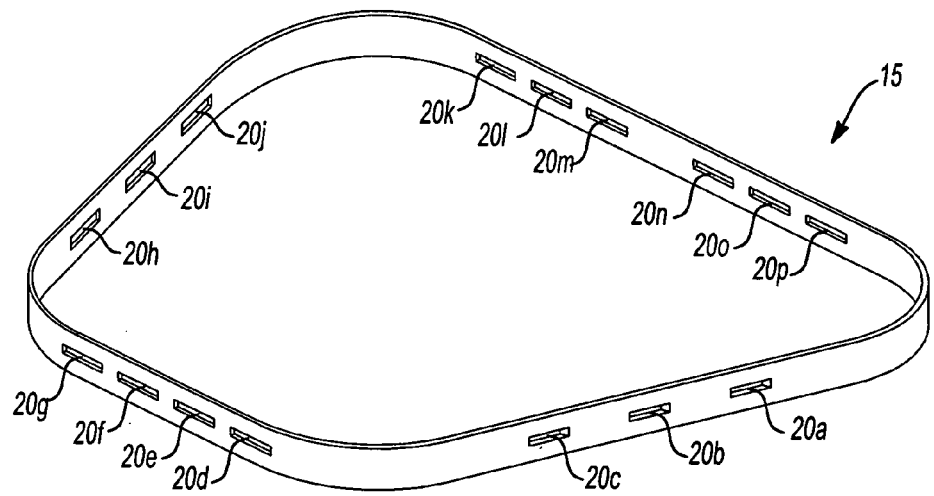
FIG. 2 is a perspective view of an arrangement for attaching a cover to an air bag housing according to a first exemplary embodiment of the invention.
Figure 3:
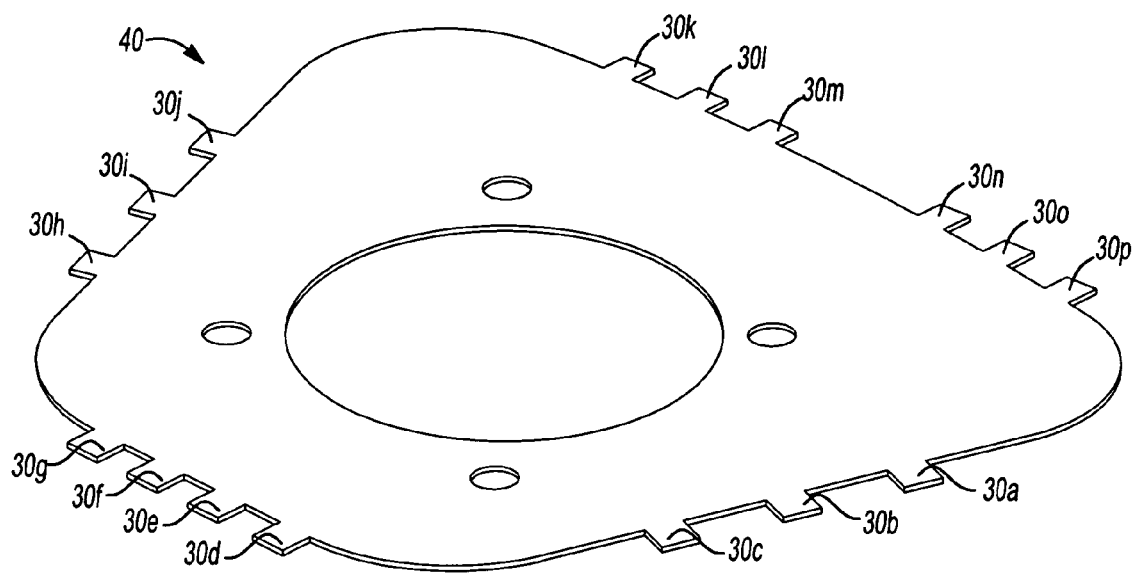
FIG. 3 is a perspective view of an air bag reaction housing according to the first exemplary embodiment of the invention.
Figure 4:
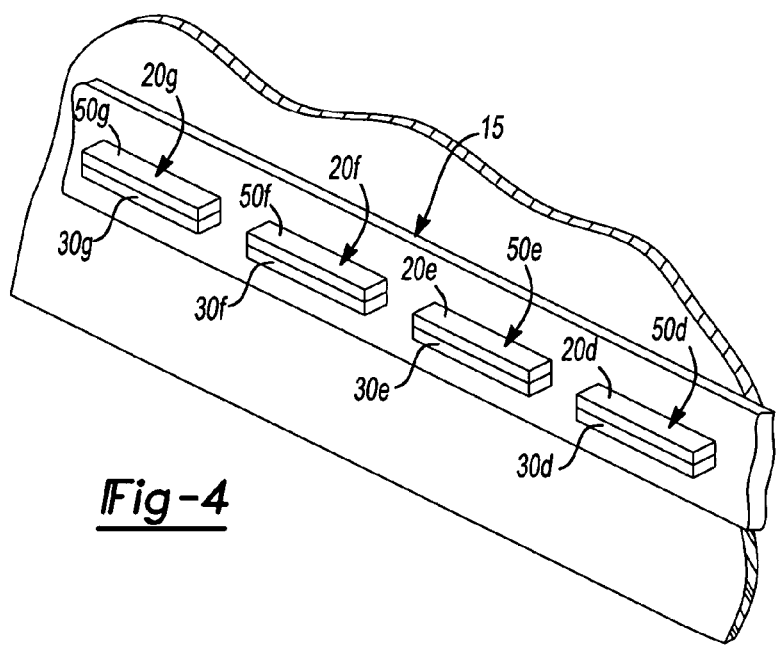
FIG. 4 is a perspective, partially sectioned view of an arrangement for attaching a cover to an air bag reaction housing according to the first exemplary embodiment of the invention.
Figure 5:
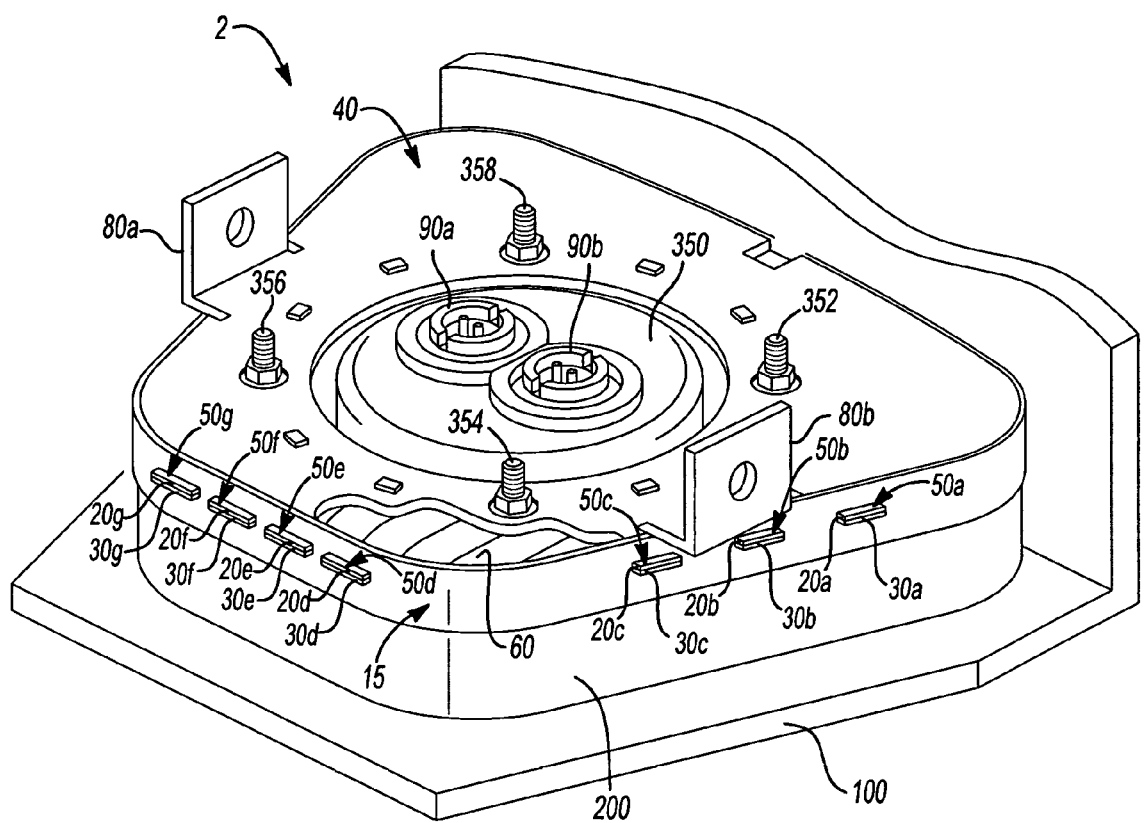
FIG. 5 is a perspective view of an airbag module assembly having an arrangement for attaching a cover to an air bag reaction housing according to the first exemplary embodiment of the invention.

Referring now to FIGS. 2-5, an exemplary embodiment of an airbag module assembly 2 is shown according to the present invention. Referring to FIG. 5, airbag module assembly 2 includes a module cover 100 having an upper, typically decorative surface with downwardly extending sidewalls 200. Tabs 50a, 50b, 50c, 50d, 50e, 50f and 50g extending in a perpendicular direction from the sidewalls 200 are spaced apart and aligned from the lower distal ends of the sidewalls 200. As is known in the art, the module cover 100 is typically provided with one or more tear seams (not shown) for providing opening of the module cover 100 upon deployment of an airbag 60.

The airbag module assembly 2 further includes a reaction housing 40 having a base with a central opening through which an upper portion of an inflator 350 projects. The inflator 350 is attached to the reaction housing 40 by fasteners 352, 354, 356 and 358. A folded airbag cushion 60 is then retained on the base of the reaction housing 40 surrounding the inflator 350 by an airbag mounting member (not shown) or retainer ring (not shown) attached to the base as is well known in the art. An electrical connector 90a, 90b is provided for coupling to an inflator 350 which serves to inflate and deploy the airbag cushion 60. The reaction housing 40 includes two brackets 80a, 80b provided for attaching the airbag module assembly 2 to the steering wheel (not shown) of the vehicle.

As shown in FIG. 3, the base of the reaction housing 40 has a plurality of tabs 30a, 30b, 30c, 30d, 30e, 30f, 30g, 30h, 30i, 30j, 30k, 30l, 30m, 30n, 30o and 30p for attaching the reaction housing 40 to the sidewalls 200 of the airbag module cover 100. As shown in FIG. 5, the airbag module cover 100 is attached to the reaction housing 40 by placing the cover over the housing, and aligning each of tabs 30a-30g with a corresponding one of tabs 50a-50g. An elastomeric retainer band 15 having openings 20a, 20b, 20c, 20d, 20e, 20f, and 20g spaced to receive the corresponding reaction housing tabs 30a-30g and airbag module cover tabs 50a-50g is also provided. As shown in FIGS. 4 and 5, the reaction housing tabs 30a-30g and airbag module cover tabs 50a-50g are then inserted into the openings 20a-20g provided in the elastomeric retainer band 15 to lockingly attach the sidewalls 200 of the airbag module cover 100 to the reaction housing 40. In the exemplary embodiment, openings 20a-20g in band 15 are dimensioned so as to provide a friction fit with the aligned tabs 30a-30g and tabs 50a-50g sufficient to maintain cover 100 in place.

Next, an airbag module assembly 3 according to a second exemplary embodiment of the present invention is described with reference to FIGS. 6 and 7. With respect to parts and components having the similar function and effect to those of the first embodiment, the same reference numbers are affixed and the detailed explanation thereof is omitted.

Figure 6:
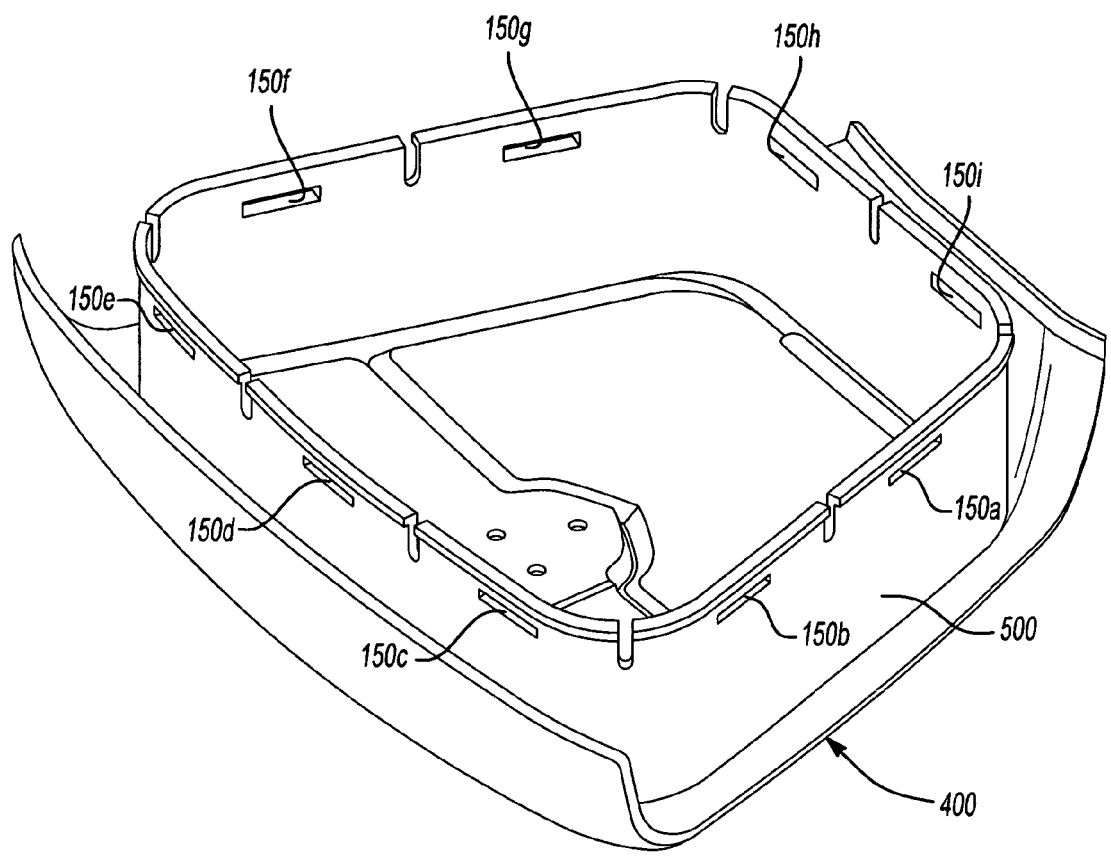
FIG. 6 is a perspective view of a cover for an airbag module assembly according to a second exemplary embodiment of the present invention.
Figure 7:
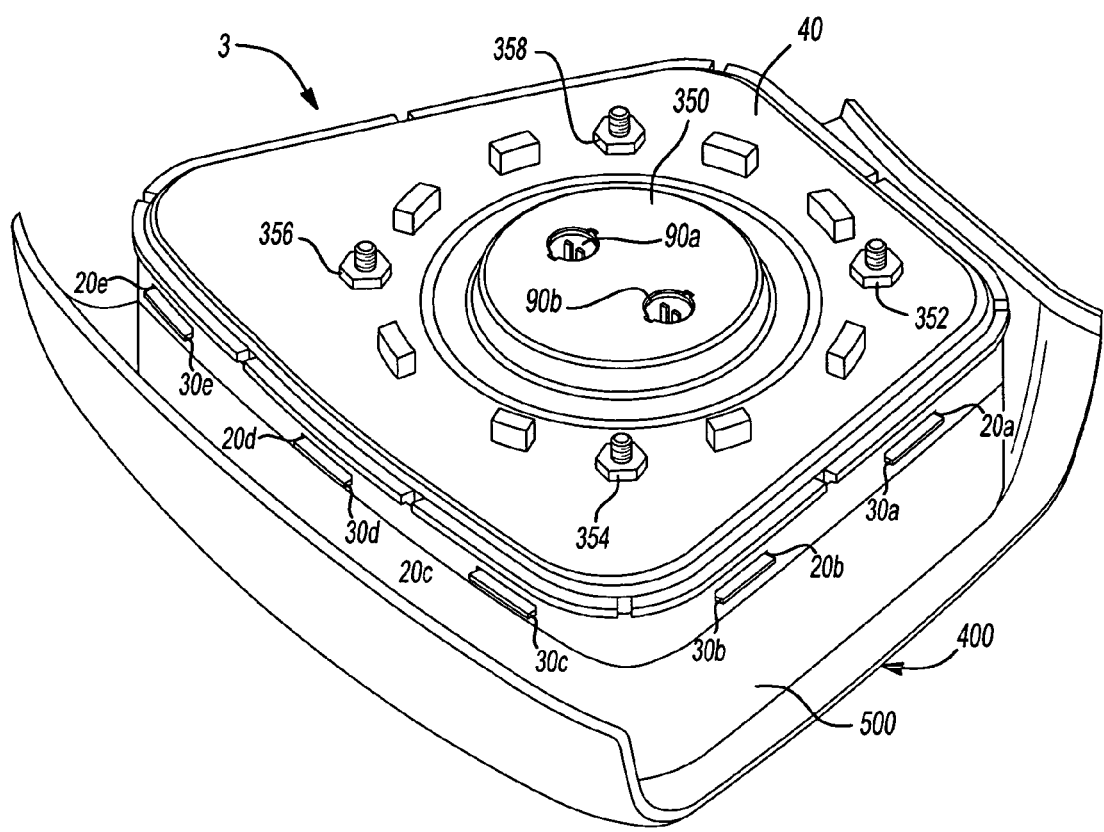
FIG. 7 is a perspective view of an airbag module assembly having the cover of FIG. 6 according to the second exemplary embodiment of the present invention.

Referring to FIG. 6, airbag module assembly 3 includes a module cover 400 having an upper, typically decorative surface with downwardly extending sidewalls 500. Slots 150a, 150b, 150c, 150d, 150e, 150f and 150g which are formed in the sidewalls 200 are spaced apart and aligned from the lower distal ends of the sidewalls 200. As shown in FIG. 3 and FIG. 7, the base of the reaction housing 40 has a plurality of tabs 30a, 30b, 30c, 30d, 30e, 30f, 30g, 30h, 30i, 30j, 30k, 30l, 30m, 30n, 30o and 30p for attaching the reaction housing 40 to the sidewalls 500 of the airbag module cover 400. As best shown in FIG. 7, the airbag module cover 400 is attached to the reaction housing 40 by placing the cover 400 over the housing 40, and biasing each of tabs 30a-30g into a corresponding one of slots 150a-150g. An elastomeric retainer band 15 having openings 20a, 20b, 20c, 20d, 20e, 20f, and 20g spaced to receive the corresponding reaction housing tabs 30a-30g is also provided. As shown in FIG. 7, the reaction housing tabs 30a-30g are then inserted into the openings 20a-20g provided in the elastomeric retainer band 15 to lockingly attach the sidewalls 500 of the airbag module cover 400 to the reaction housing 40. In the exemplary embodiment, openings 20a-20g in band 15 are dimensioned so as to provide a friction fit with the aligned tabs 30a-30g sufficient to maintain cover 400 in place.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An arrangement for retaining a cover to an airbag housing, the airbag housing including a reaction housing portion, said retaining arrangement comprising:
    a plurality of cover tabs extending outwardly from a surface of said cover;
    a plurality of housing tabs extending outwardly from a surface of said reaction housing, the plurality of cover tabs and housing tabs positioned such that each cover tab will overlap, be generally parallel with, and abut a corresponding housing tab when the cover is engaged with the air bag housing; and
    a removable retainer ring of endless construction extending continuously about an outer periphery of the airbag housing, said removable retainer ring having a plurality of openings formed therein each positioned to receive an abutting pair of cover tabs and housing tabs, wherein each one of said plurality of cover tabs and housing tabs are biased into a corresponding one of said openings in said retainer ring removably securing said reaction housing to said cover.

2. The arrangement of claim 1 wherein the reaction housing has a portion that overlies a top of an airbag and a sidewall surface extending about an outer periphery of said airbag, and wherein said sidewall surface of said reaction housing is coplanar with the plurality of housing tabs.

3. The arrangement of claim 1 wherein said retainer ring is comprised of an elastomeric material.

4. The arrangement of claim 1 wherein the plurality of tabs extending from the reaction housing are integrally formed in the reaction housing.

5. The arrangement of claim 1 wherein the plurality of tabs extending from the module cover are integrally formed in the module cover.

6. An airbag module assembly, comprising:
a cover including at least one of a plurality of cover openings or a plurality of cover tabs;
a housing including a plurality of housing tabs extending outwardly from a surface of the housing and corresponding to the cover openings or tabs when the cover is engaged with the housing, the surface being coplanar with the plurality of housing tabs;
a removable elastomeric retainer ring of endless construction having openings formed therein and positioned to receive the housing tabs therein removably securing the housing to the cover;
wherein the cover has an outer surface and a sidewall extending outwardly therefrom that comprises the at least one of a plurality of cover openings or a plurality of cover tabs, wherein the retainer ring comprises an elongate elastomeric band that frictionally engages each housing tab received in a corresponding opening formed in the elastomeric band, and wherein the cover and the housing define an airbag receiving volume therebetween; and
wherein each opening in the elastomeric band is dimensioned so the elastomeric band provides a friction fit with the corresponding housing tab received in the opening.

7. The airbag module of claim 6 wherein the retainer ring is positioned so it encompasses an entire outer peripheral sidewall of the airbag module.

8. The airbag module of claim 7 wherein the plurality of the housing tabs are integrally formed in the housing.

9. The airbag module of claim 7 wherein the cover has a plurality of the cover tabs integrally formed in the cover, each one of which overlaps and is generally parallel with a corresponding one of the housing tabs defining first and second pairs of overlapping and generally parallel housing and cover tabs received in a corresponding one of the openings in the retainer ring.

10. The airbag module of claim 6 wherein the cover has a plurality of cover tabs that each overlap a corresponding housing tab, wherein the elongate elastomeric band frictionally engages each pair of overlapping cover and housing tabs received in a corresponding opening formed in the elastomeric band, and wherein the cover and the housing define an airbag receiving chamber therebetween.

11. The airbag module of claim 10 wherein each opening in the elastomeric band is dimensioned so the elastomeric band provides a friction fit with each corresponding pair of overlapping cover and housing tabs received in the opening.

* * * * *